(12) United States Patent
Rogelet

(10) Patent No.: US 6,688,878 B1
(45) Date of Patent: Feb. 10, 2004

(54) GAS LIGHTING RODS

(75) Inventor: Thierry Rogelet, Lyons (FR)

(73) Assignee: Swedish Match Lighters B.V., Am Assen (NL)

( * ) Notice: Subject to any disclaimer, the term of this patent is extended or adjusted under 35 U.S.C. 154(b) by 0 days.

(21) Appl. No.: 09/646,222

(22) PCT Filed: Apr. 6, 1999

(86) PCT No.: PCT/IB99/00599

§ 371 (c)(1),
(2), (4) Date: Aug. 7, 2001

(87) PCT Pub. No.: WO00/08387

PCT Pub. Date: Feb. 17, 2000

(30) Foreign Application Priority Data

Aug. 5, 1998 (FR) .................................................. 981007

(51) Int. Cl.⁷ ................................................ F23D 11/36
(52) U.S. Cl. ........................................ 431/153; 431/344
(58) Field of Search .................................. 431/153, 255

(56) References Cited

U.S. PATENT DOCUMENTS

| 5,655,901 A | 8/1997 | Makoto | |
|---|---|---|---|
| 5,662,466 A | 9/1997 | Cheng | |
| 5,697,775 A | 12/1997 | Saito et al. | |
| 5,971,751 A * | 10/1999 | Lee | 431/255 |
| 6,050,811 A * | 4/2000 | Stein | 431/153 |
| 6,093,017 A * | 7/2000 | Saito et al. | 431/153 |
| 6,126,437 A * | 10/2000 | Lixiang et al. | 431/153 |
| 6,135,762 A * | 10/2000 | Hu | 431/153 |
| 6,186,773 B1 * | 2/2001 | Sung | 431/153 |
| 6,244,858 B1 * | 6/2001 | Wang | 431/153 |
| 6,386,860 B1 * | 5/2002 | Adams et al. | 431/153 |

* cited by examiner

*Primary Examiner*—Henry Bennett
*Assistant Examiner*—James Barrow
(74) *Attorney, Agent, or Firm*—Oliff & Berridge, PLC

(57) ABSTRACT

A gas lighting rod comprises a gas release valve and a piezoelectric igniting system, both operated by a spring-loaded operating member, and a spring-loaded safety member which has to be operated to release the operating member. The operating member is aligned transversely and the safety member includes a pivoted lever having a lock/release arm extending generally along an axis of the operating member and interacting therewith, and a control arm engaged on one other side of a pivot and from an opposite side of the lighting rod from the operating member. The lock/release arm is substantially enclosed within the operating member, and its end is sloped such that its engagement with the operating member tends to urge the end into a locked position if a user attempts to operate the operating member without first fully operating the safety member.

8 Claims, 2 Drawing Sheets

GAS LIGHTING RODS

BACKGROUND OF THE INVENTION

1. Field of the Invention

The present invention relates to gas lighting rods.

2. Description of Related Art

A gas lighting rod is a wand-like device used for lighting fires, comprising a source of gas and an operating member which, when manually pressed down, opens a gas flow path to the end of the device and, by means of a piezo-electric element, generates a spark for igniting the gas. The operating member is spring-loaded to return to its normal; position after operation. Various examples are described, for example, in U.S. Pat. No. 5,697,775 (Tokai).

It is important to provide a safety mechanism, to reduce the chances of the device being operated by children. The standard safety technique is to provide a spring-loaded safety member which has to be operated before the operating member can be operated; the safety member can be moved transversely to the operating member to release the operating member. The operating member moves generally longitudinally along the axis of the lighting rod, and the safety member thus moves transversely to the axis of the lighting rod.

We have found that this relationship, between the operating and safety members has significant disadvantages. The application of a high force on the operating member is liable to cause distortion of the safety member such that the operating member becomes freed and can therefore move and cause ignition. The spring force on the safety member needs to be limited in order to limit friction with the operating member; if the spring force is too high, when die safety member is released and the operating member is operated, the latter may be blocked in an intermediate position. Further, in such an intermediate state or position, the operating member may not return fully to its normal position, so holding the safety member in the release position; the operating member can then be operated without the safety member having to be operated first to release it.

SUMMARY OF THE INVENTION

According to die invention there is provided a gas lighting rod comprising a gas release valve and a piezo-electric lighting system both operated by a spring-loaded operating member, and a spring-loaded safety member which has, to be operated to release the operating member, characterized in that the operating member is aligned transversely and the safety member comprises a pivoted lever having a lock/release arm extending generally along the axis of the operating member and interacting therewith and a control arm engaged on the other side of the pivot and from the opposite side of the lighting rod from the operating member.

The end of the lock/release arm is preferably sloped such that its engagement with the operating member tends to urge it into the locked position if the user attempts to operate the operating member without first fully operating the safety member. This arm is also preferably substantially enclosed within the operating member.

The spring force provided by the piezo spring may be enough to provide the required spring bias to the operating member so that an additional biasing spring for the operating member is not required.

This arrangement has various structural advantages. The fact that the lock/release arm is substantially enclosed within the operating member means that even under the application of an extremely high force on the operating member, the safety member will remain effective to restraint movement of the operating member. The spring force on the safety member can be adjusted within wide limits without resulting in undue friction with the operating member. Further, the system is virtually immune to the safety member taking up an intermediate state or position in which the operating member can be operated a second time without having to operate the safety member, as the safety member is biased from such a potential intermediate position towards the correct position.

The arrangement also has the functional advantage that it is particularly easy and comfortable to operate. It can readily be held in the hand in such a way that the users thumb falls comfortably onto the operating member on one side of the lighting rod and their forefinger on the control arm of the safety member on the opposite side (or possibly vice versa). In contrast, in the prior art designs, the longitudinal arrangement of the operating member and the transverse arrangement of the safety member can make operation of the lighting rod awkward and inconvenient.

BRIEF DESCRIPTION OF THE DRAWINGS

A lighting rod embodying the invention will now be described, by way of example, with reference to the drawings, in which.

DETAILED DESCRIPTION OF PREFERRED EMBODIMENTS

Figure 1:
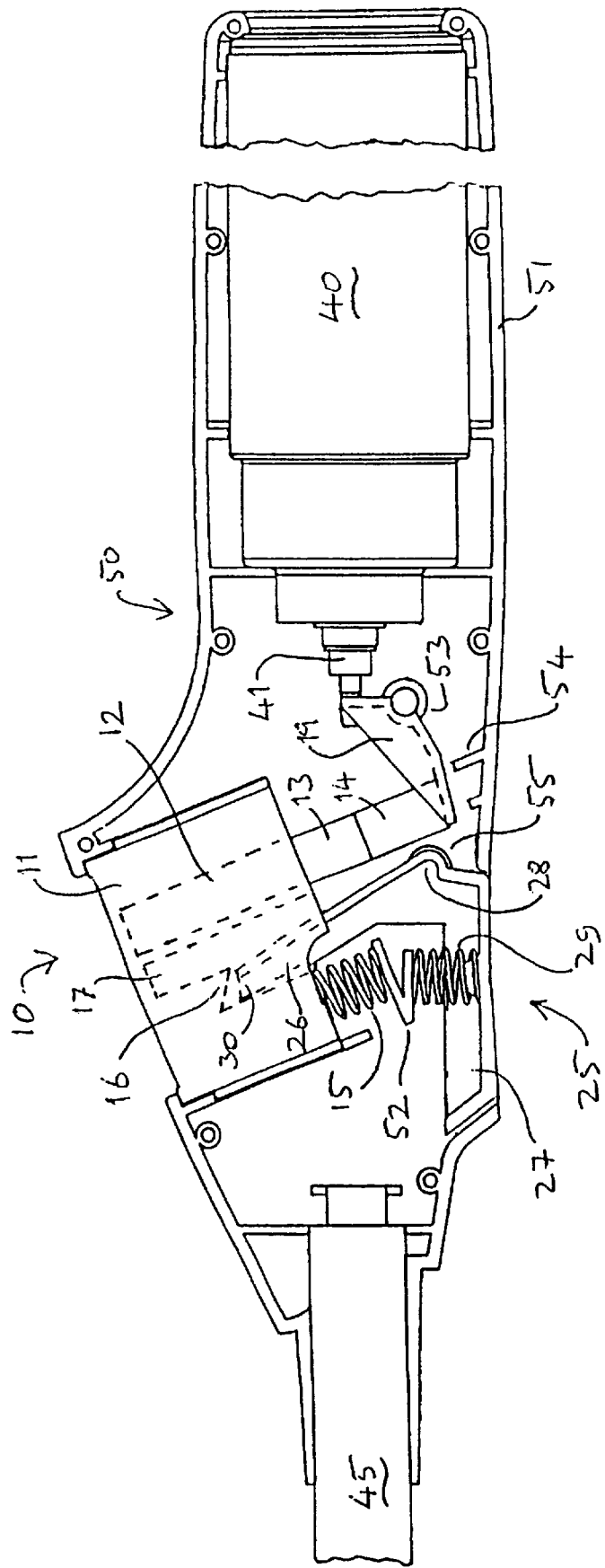
FIG. 1 is a simplified view of the lighting rod from the side, with part of the casing removed, showing the normal state.

Referring to FIG. 1, the main components of the lighting rod comprise an operating member 10, a safety member 25, a gas container 40, a nozzle assembly 45, and a casing 50. Only those elements relevant for present purposes are shown, and in simplified form.

The casing 50 is of the clam-shell type, consisting of two half-shells which are broadly mirror images of each other and fit together by pin and socket elements around their meeting edges. The drawing shows the lighting rod with the front half-shell removed so that the rear half-shell 51 is visible. This casing holds the other components in place. In particular, it holds the gas bottle 40 at the right-hand end and the nozzle assembly 45 at the left-hand end.

The operating member 10 comprises a button 11 which has a bore 12 containing a piezo-electric mechanism comprising two elements 13, 14. The button 11 is urged into the upwards position, ie the position shown, by a spring 15 which engages in a bore (not shown) in the button and against a stop 52 formed as part of the half-shell 51. The piezo spring (not shown) also provides spring biasing force on the operating button 11. In an alternative embodiment which is not shown it is possible to provide the operating button 11 without its own spring 15 but in a way which relies entirely on the biasing force of the piezo spring (not shown).

The button 11 can be manually depressed against the force of the spring 15, and the piezo spring, moving the piezo-electric mechanism 13–14 downwards. A lever 19 is located as shown, pivoted on a pivot bearing 53 formed as part of the casing 50. This lever 19 engages the valve 41 of the gas bottle 40. Downward movement of the piezo-electric mechanism 13–14 rotates the lever 19 anti-clockwise, so operating the valve 41 and releasing a flow of gas from the bottle 40. This gas flows to the end of the nozzle assembly 45.

The movement of the piezo-electric mechanism 13–14 is limited by a stop 54 formed as part of the casing 50. Further pressure on the button results in compression of the two elements 13 and 14 of the piezo-electric mechanism 13–14 together and the generation of a spark at the end of the nozzle assembly 45. The compression of the piezo-electric elements occurs after the release of the gas flow, so the gas flow should have reached the end of the nozzle assembly by the time the spark is produced.

The safety member 25 (shown partly in section) consists of two arms, a lock/release arm 26 and a control arm 27. These two arms are joined to form an L shape. The vertex 28 of the L forms a pivot which pivots in a pivot bearing 55 formed as part of the casing 50. The safety member 25 is urged anti-clockwise by a spring 29, which engages with the inside of the control arm 27 and bears against the stop 52 formed as part of the casing 50. The outside of the control arm 27 is normally substantially flush with the casing 50, as shown.

The lock/release arm 26 of the safety member 25 is contained within a bore 17 of the button 11. This bore contains a projecting stop element 16 at its upper end, so that the bore 17 is wide in its lower part and narrow in its upper part. In the normal position of the safety member 25, the top end 30 of the lock/release arm bears against this projecting element 16 as shown. As a result, the operating member is locked against movement. When the safety member is operated, however, by manual depression of the control arm 27, the lock/release arm 26 rotates clockwise. This brings its upper end 30 out of engagement with the projecting element 16 in the button 11 and into alignment with the upper part of the bore 17. As a result, the button 111 is released for movement; this button can therefore be depressed, with the lock/release arm 26 of the safety member 25 moving up in the upper part of the bore 17.

The end 30 of the lock/release arm 26 of the safety member 25 is angled as shown, and the stop 16 in the bore 17 has a corresponding or greater angle. As a result, the button 11 can be depressed only if the safety catch has been fully operated. If the safety catch is not fully operated, ie if the end 30 of the lock/release arm 26 of the safety member 25 is not moved fully out of engagement with the stop 16, then the slope on the end 30 of this arm and the angled surface of the stop 16 will result in any pressure on the button 11 tending to force the safety member back anti-clockwise into the locked position.

After the button 12 has been depressed, the safety button 25 can be released. The arm 26 will then move back anti-clockwise about the pivot 53, with its end pressing lightly against the side of the bore 17. When the button 10 is then released, this button will rise back to the position shown. The end of the arm 30 will slide along the side of the bore 17, with relatively low friction, until it reaches the projecting element 16, when it will jump back into the position shown.

Figure 2:
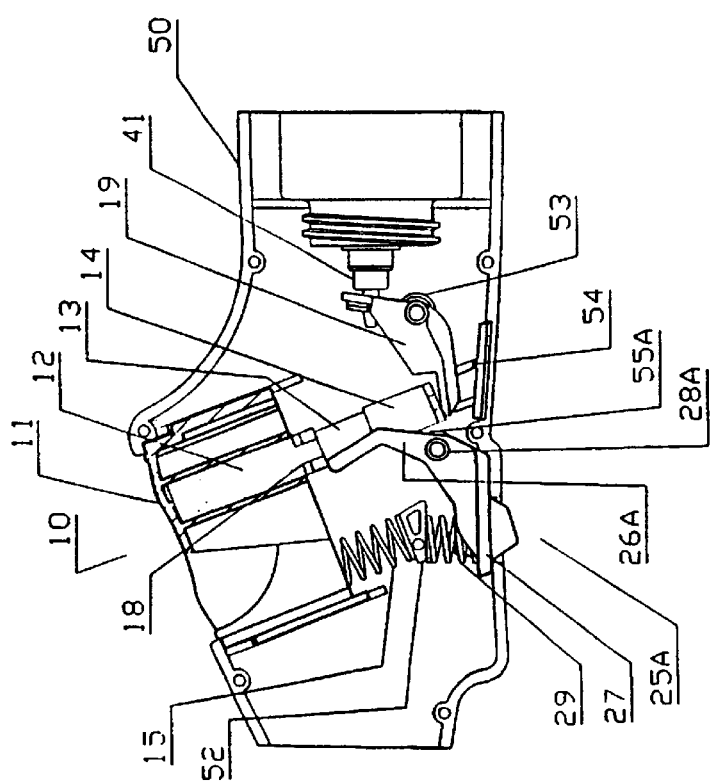

FIG. 2 shows a modification of this arrangement; the same reference numerals are used for corresponding parts, with added "A"s where the parts have significantly different forms. A common type of piezoelectric mechanism 13–14 has a pair of projections 18 on one of the elements 13–14. In the FIG. 2 arrangement, a piezo-electric mechanism of this form is used, with the projections 18 being oriented as shown. The lock-release arm 26A of the safety member 25A is arranged to engage with these projections 18 on the control rod 12 as shown.

Figure 3:
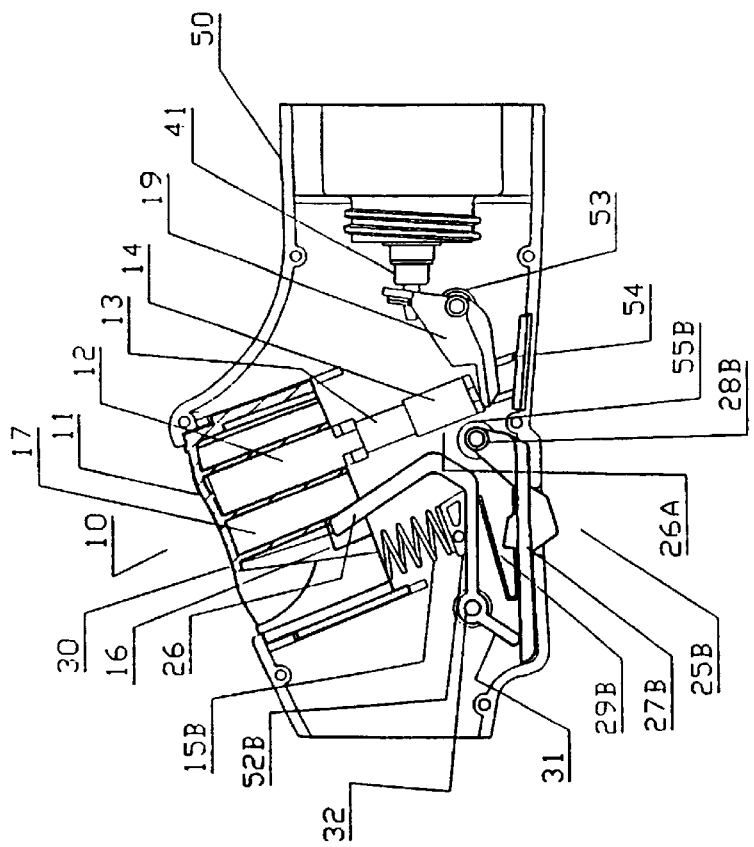
FIGS. 2 and 3 are partial simplified views of two modifications of the lighting rod of FIG. 1.

FIG. 3 shows a further modification of the FIG. 1 arrangement, again with the same reference numerals and with added "B"s where the parts have significantly different forms. In this arrangement, the safety member is a lever 31. This lever has a right-hand arm which is cranked to have an upward extension 26 which engages with the bore 17 and step 16 of the operating member 10 as before. The lever 31 is pivoted at 32, and its left-hand arm extends horizontally beyond this pivot as shown. This safety member 31 is separate from the control or safety button 25B, which has an extension at its left-hand end which engages with the left-hand end of the left-hand horizontal arm of the safety member.

The spring 15B which engages with the control button 10 engages at its other end with a stop 52B on the casing 50. However, the spring 29B operates between the safety button 25B and the right-hand part of the safety member 31.

It is obvious that the modifications of FIGS. 2 and 3 can both be applied simultaneously to the arrangement of FIG. 1. It will also be apparent to persons skilled in the art that other modifications to the described embodiments are possible whilst still including the essential elements of the invention as defined by the appended claims.

What is claimed is:

1. A gas lighting rod comprising a gas release valve and a piezoelectric igniting system, both operated by a spring-loaded operating member, and a spring-loaded safety member which has to be operated to release the operating member, wherein the safety member comprises: a pivoted lever having a lock/release arm extending generally along an axis of the operating member and interacting with the operating member, and a control arm engaged on an other side of a pivot and from an opposite side of the lighting rod from the operating member.

2. A gas lighting rod according to claim 1, wherein an end of the lock/release arm is sloped such that its engagement with the operating member tends to urge the end into a locked position if a user attempts to operate the operating member without first fully operating the safety member.

3. A gas lighting rod according to claim 1, wherein the lock/release arm is substantially enclosed within the operating member.

4. A gas lighting rod according to claim 1, wherein the safety member is integral with a safety button comprising a surface engageable by a user.

5. A gas lighting rod according to claim 4, wherein the safety button is pivoted to bear on a separate safety member.

6. A gas lighting rod according to claim 1, wherein the operating member is spring loaded by a separate operating member spring in addition to a spring force provided by the piezoelectric igniting system.

7. A gas lighting rod according to claim 1, wherein the operating member is spring loaded entirely by a spring force provided by the piezoelectric igniting system.

8. A safety device in a lighting rod, wherein the lighting rod is provided with a rod-like top end portion and a main body, the rod-like top end portion being provided with a jetting nozzle for jetting out a gas, the main body being provided with a gas tank, a valve mechanism for opening and closing a path through which the gas is supplied from the gas tank to the jetting nozzle, a piezoelectric unit for generating a discharge voltage for lighting the gas, and an operation member which drives the valve mechanism and the piezoelectric unit in order to carry out a lighting operation, the safety device comprising:

locking means, which is supported for rotation on an opposite side of the main body to the operation member, to be rotatable between a locking position which prevents the lighting operation of the operation member and a lock release position which permits the lighting operation of the operation member; and urging means which urges the locking means toward the locking position.

* * * * *